United States Patent [19]
Lovey

[11] 3,913,757
[45] Oct. 21, 1975

[54] CONTROL SYSTEM FOR LOAD CARRIER AND ASSOCIATED TRANSFER APPARATUS

[75] Inventor: George Leslie Lovey, East Lake, Ohio

[73] Assignee: Otis Elevator Company, New York, N.Y.

[22] Filed: Nov. 14, 1974

[21] Appl. No.: 523,935

[52] U.S. Cl............ 214/38 BA; 14/71 A; 198/111; 244/137 R; 318/648
[51] Int. Cl.² ........................................ B65G 67/02
[58] Field of Search ............... 214/38 BA; 198/111; 14/71 A; 318/648

[56] References Cited
UNITED STATES PATENTS
3,599,262  8/1971  Carder..................... 214/38 BA X
3,628,117  12/1971  Eggert........................... 318/648 X

Primary Examiner—Robert G. Sheridan
Attorney, Agent, or Firm—Robert T. Mayer; Joseph L. Sharon

[57] ABSTRACT

A control system for material handling apparatus including a load carrier and associated transfer apparatus for transferring cargo between the nose opening of an aircraft and the load carrier. The system is capable of causing the transfer apparatus to align itself in its pitch and roll axes with the corresponding axes of the aircraft for transferring cargo from the aircraft to the transfer apparatus and is likewise capable of causing the transfer apparatus to change its alignment status until it is disposed in a horizontal plane. In such disposition the control system causes the load carrier and transfer apparatus to be vertically aligned.

7 Claims, 3 Drawing Figures

FIG. 3 ative in response to the operation of the cargo sensing means to dispose and maintain the transfer apparatus in its second condition.

CONTROL SYSTEM FOR LOAD CARRIER AND ASSOCIATED TRANSFER APPARATUS

This invention relates to material handling apparatus and more particularly to a system for controlling the operation of a load carrier and associated transfer apparatus which is capable of transferring cargo between an aircraft and the load carrier.

Recent increases in the shipment of cargo by air has led to the development of various pieces of material handling equipment for loading and unloading freight carrying airplanes. For the most part these have taken the form of wheeled units, the load supporting surfaces of which are capable of being raised and lowered between the aircraft level and a level at which fork lift trucks and other typical material handling devices can transfer loads to and from them. A loading and unloading unit of this type can be driven up to the aircraft cargo door and temporarily stationed there until all its unloading and loading tasks are completed. Under such conditions, fork lift trucks or other mobile material handling devices are normally employed to transport cargo between the loading and unloading unit and storage. On the other hand, the unit being mobile, may itself be employed to transfer cargo to and from storage areas in addition to loading and unloading the aircraft.

With the more recent re-introduction of freight carrying aircraft capable of having its nose opened to permit loading and unloading through the resulting nose opening, a stationary loading and unloading unit has been developed. Aircraft are towed to this unit to enable cargo to be transferred to and from it. Being immobile, however, fork lift trucks or other mobile material handling apparatus must be employed to transport cargo between the unit and storage. This is not the unit's only limitation.

As cargo is moved on and off an airplane through its nose opening, it pitches and rolls and moves vertically as a result of the movement of the load. Previously built loading and unloading units are not provided with the capability of following these movements of the airplane. Consequently, although it is desirable for optimum loading to have the airplane carry long containers whose cross-sectional dimensions are within close tolerances of the dimensions of the nose opening, it is not possible for these previous units to load and unload such containers. Their incapability of following the pitch and roll of an airplane could cause such a container to strike and damage the plane were it to pitch and roll, as it is wont to do, while the container is being loaded or unloaded.

It is an object of this invention to provide a control system for improved apparatus capable of transferring cargo to and from an aircraft through a nose opening.

It is a more specific object of this invention to provide a control system which is capable of causing the load conveying equipment mounted on apparatus for loading and unloading an airplane through its nose opening to be disposed and maintained in a condition in which its pitch and roll attitudes match the corresponding attitudes of conveying equipment aboard an airplane it is loading or unloading and in which the vertical height of the conveying equipment on said apparatus adjacent the nose opening is level with that aboard the aircraft at the nose opening.

It is also desirable in transferring cargo to and from an aircraft by means of stationary loading and unloading apparatus to transport the cargo from the loading and unloading area to storage expeditiously. In the disclosed constructed embodiment a stationary loading and unloading unit capable of following the movements an airplane undergoes when cargo is transferred to and from it through its nose opening has been constructed. This unit has also been made accessible to a load carrier capable of automatically transferring articles it receives from the stationary unit to remote storage bins. In order to operate efficiently the loading and unloading unit has been built with the capacity to dispose itself in a condition in which its conveying equipment is disposed in a horizontal plane so that it might transfer cargo to and from conveying equipment on the load carrier. In addition, since the loading and unloading apparatus when disposed in this horizontal plane is at a variable vertical level determined by the vertical level of the conveying equipment on the airplane at its nose opening, the conveying equipment on the load carrier and the loading and unloading apparatus are automatically aligned vertically before cargo can be transferred between the two.

It is therefore another object of this invention to provide a control system for a load carrier and associated load transferring apparatus of the type described which upon the disposition of the conveying equipment on the apparatus into a horizontal plane causes the load carrier to move its conveying equipment into alignment with that on the transfer apparatus.

According to the invention there is provided a control system for a load carrier and associated transfer apparatus each of which supports cargo conveying equipment. The transfer apparatus is disposable in a first condition in which its conveying equipment is capable of transferring cargo to and from conveying equipment aboard an aircraft through an opening in its nose when the aircraft is appropriately positioned adjacent one end of the transfer apparatus. The transfer apparatus is also disposable in a second condition in which its conveying equipment is capable of transferring cargo to and from the conveying equipment of the load carrier when it is appropriately located adjacent the end of the transfer apparatus opposite its aircraft end. The control system comprises a first switch means and first control means which operates in response to the operation of the first switch means to cause the transfer apparatus to be disposed and maintained in its first condition in which the pitch and roll attitudes of its conveying equipment are in conformity with the corresponding attitudes of the conveying equipment aboard the aircraft and the vertical height of the aircraft end of the conveying equipment on the transfer apparatus is level with the conveying equipment on the aircraft at its nose opening. Also included in the control system is a second switch means operable to disable the first control means. Second control means which also forms part of the control system operates in response to the operation of the second switch means to cause the transfer apparatus to be disposed and maintained in the second condition in which its conveying equipment is disposed in a horizontal plane. The control system also includes a transfer selection switch which is operable to select either an aircraft loading or unloading operation for the transfer apparatus and a cargo sensing means which operates in response to the presence of cargo on the conveying equipment of the transfer apparatus. A third control means also included in the control system operates in response to the operation of the transfer selection means to select an aircraft unloading operation and the operated condition of the cargo sensing means to cause the load carrier and the transfer apparatus to assume a relationship in which there is vertical alignment between their respective conveying equipment when the transfer apparatus is disposed in its second condition.

Further objects, features and advantages of the invention will be evident from the following description when considered in conjunction with the appended claims and the accompanying drawing, in which.

It is to be understood that the circuitry disclosed herein for purposes of describing the invention is much more simplified than that provided in the commercial installation upon which this application is based. It is also to be assumed that suitable voltage is applied across lines L1 and L2 of FIG. 3 to operate all pieces of electrical apparatus shown connected across those lines in the circuit diagram. It is also to be understood that all control apparatus disclosed herein is conveniently located physically with respect to the mechanical equipment it controls.

All electromagnetic switches are shown with their contacts in the condition in which they would be if their switches were not actuated. All electromechanical switches are shown with their contacts disengaged. All light responsive switches are shown with their contacts in the condition in which they would be if light was not impinging on their photocell units.

Figure 1:
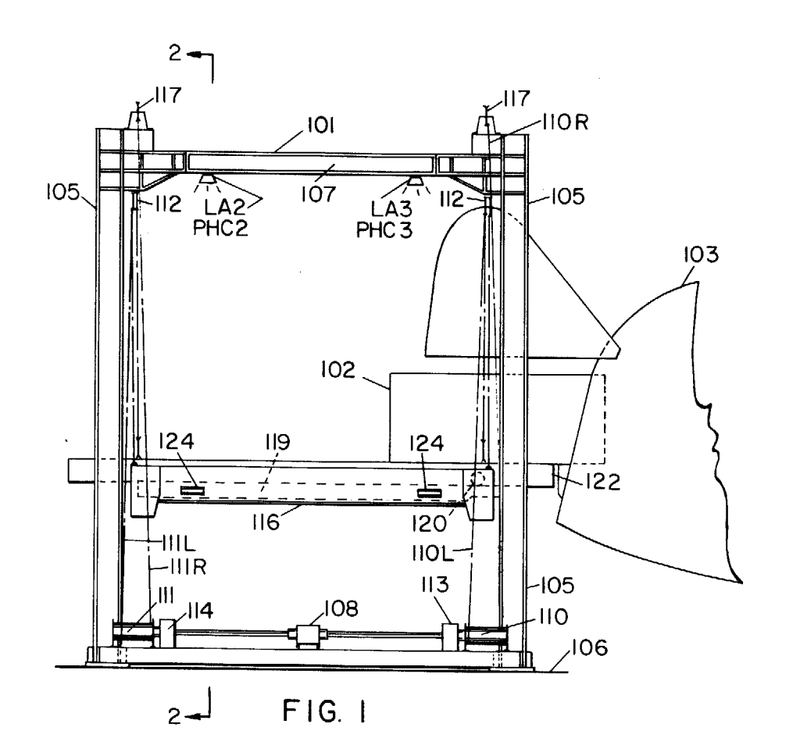
FIG. 1 is a simplified side elevation of transfer apparatus of the type appropriate to the control system of the invention shown with the nose end of an aircraft adjacent it.
Figure 2:
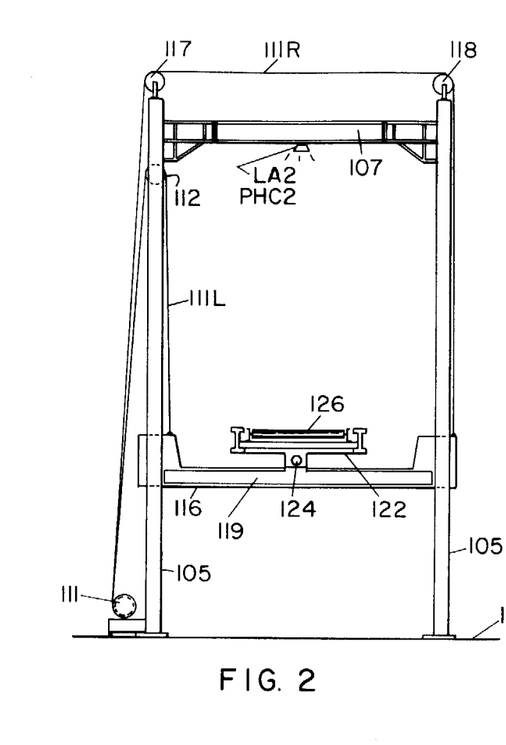
FIG. 2 is a simplified angularly exaggerated view of the apparatus of FIG. 1 taken along line 2—2.

Referring now to the drawing, illustrated in FIG. 1 is transfer apparatus 101 for transferring cargo, such as container 102, to and from aircraft 103 through an opening in its nose. Transfer apparatus 101 includes main frame comprising four upright supports 105 each bolted in a suitable manner to floor 106 of the building in which the transfer apparatus is installed. Connected securely to the top of upright supports 105 is an upper support frame 107. Mounted on floor 106 adjacent the left hand side of transfer apparatus 101 as viewed in FIG. 2, is suitable hoisting machinery comprising hoisting motor 108 and front and rear hoisting drums 110 and 111. The shaft of motor 108 is connected to drive drums 110 and 111 through suitable gear reduction units 113 and 114, respectively.

Hoisting drums 110 and 111 are each cut with both right-hand and left-hand rope grooves to accommodate a pair of hoisting ropes 110L, 110R and 111L, 111R respectively. One of the hoisting ropes on each of the drums (ropes 110L and 111L) is paid around a sheave 112 (FIG. 2) suspended from the front and rear of the bottom of upper frame 107 on the left hand side thereof. Each of these ropes is terminated in a dead-end hitch on the left-hand side of hoisting frame 116. The other hoisting rope on each drum (ropes 110R and 111R) is paid around a pair of sheaves, 117 and 118, (FIG. 2) mounted one above each side of upper frame 107. Each of these ropes is terminated in a dead-end hitch on the right-hand side of hoisting frame 116.

Hoisting frame 116 is supported from transfer apparatus 101 in any suitable manner, such as on guide rails (not shown) fastened to uprights 105, which will permit it to be raised and lowered by the appropriate rotation of hoisting drums 110 and 111. A pitch frame 119 is suitably mounted inside hoisting frame 116 and pivots about two pins 120, one of which is connected to hoisting frame 116 on each side of its forward or aircraft end. In FIG. 2, pitch frame 119 has been shown raised an exaggerated amount to more clearly illustrate other parts of this apparatus. In the disclosed constructed embodiment, pitch frame 119 is also movable laterally with respect to hoisting frame 116 for purposes which will be explained later. This capability is inconsequential to the present invention and accordingly the apparatus for accomplishing it will not be described.

A roll frame 122 which is longer than pitch frame 119 is suitably mounted atop frame 119 and pivots about two pins 124, one of which is connected at each end of the pitch frame. Mounted atop roll frame 122 is conveying equipment which in the disclosed constructed embodiment includes a plurality of motor driven unitary rollers 126 extending completely across the usable width of the roll frame. In addition, on a section of the roll frame (not identifiably illustrated) at the aircraft end thereof a plurality of motor driven caster sized polyurethane tires, larger rubber tires and shorter rollers are combined with rollers of the length of rollers 126 to serve as another part of the conveying equipment of transfer apparatus 101. This last mentioned section of roll frame 122 is extendable and retractable with respect to the rest of the transfer apparatus. It is employed to close the gap between the conveying equipment on roll frame 122 and cooperating conveying equipment on aircraft positioned adjacent transfer apparatus 101. The conveying equipment aboard such aircraft suitably takes the form of a plurality of powered caster type conveyors for rolling cargo between the front and rear of the aircraft.

A load carrier (not shown) similar to one of the movable towers 89 or 90 of U.S. Pat. No. 3,441,713 is installed in the disclosed constructed embodiment and serves a plurality of nearby storage bins (not shown) by transferring cargo between the storage bins and transfer apparatus 101. The load carrier of the constructed embodiment contains different load supporting elements than the towers of the forementioned patent in order to render it more suitable for its purpose. Instead of having rigid members 166 and 182 mounted on base unit 165 as is the case with the towers shown in the forementioned patent, the load carrier of the disclosed constructed embodiment contains conveying equipment in the form of a plurality of motor driven roller conveyors suitably mounted thereon. These rollers cooperate with those on transfer apparatus 101 to enable cargo to be transferred therebetween.

In addition, the motor control system of the load carrier of the disclosed embodiment stops the load carrier at each of its bins with its roller conveyors horizontally aligned and leveled with cooperating rollers mounted in each bin. This is in contrast with the operation of the equipment disclosed in the forementioned patent. In that, each of the towers stops with its fingers 142 or 143, whichever is carrying or is prepared to carry a vehicle, either slightly above or slightly below the level of the fingers in a stall, depending upon whether a parking or unparking operation is taking place. The operation of the present load carrier also differs when it stops to serve the transfer apparatus. At that position it stops with its roller conveyors laterally aligned with those of that apparatus but vertically positioned slightly higher than the latter roller conveyors. Equipment capable of providing such types of operation is well known to those skilled in the automatic material handling art in which such load carriers are found and it is deemed unnecessary to otherwise disclose it herein.

Figure 3:
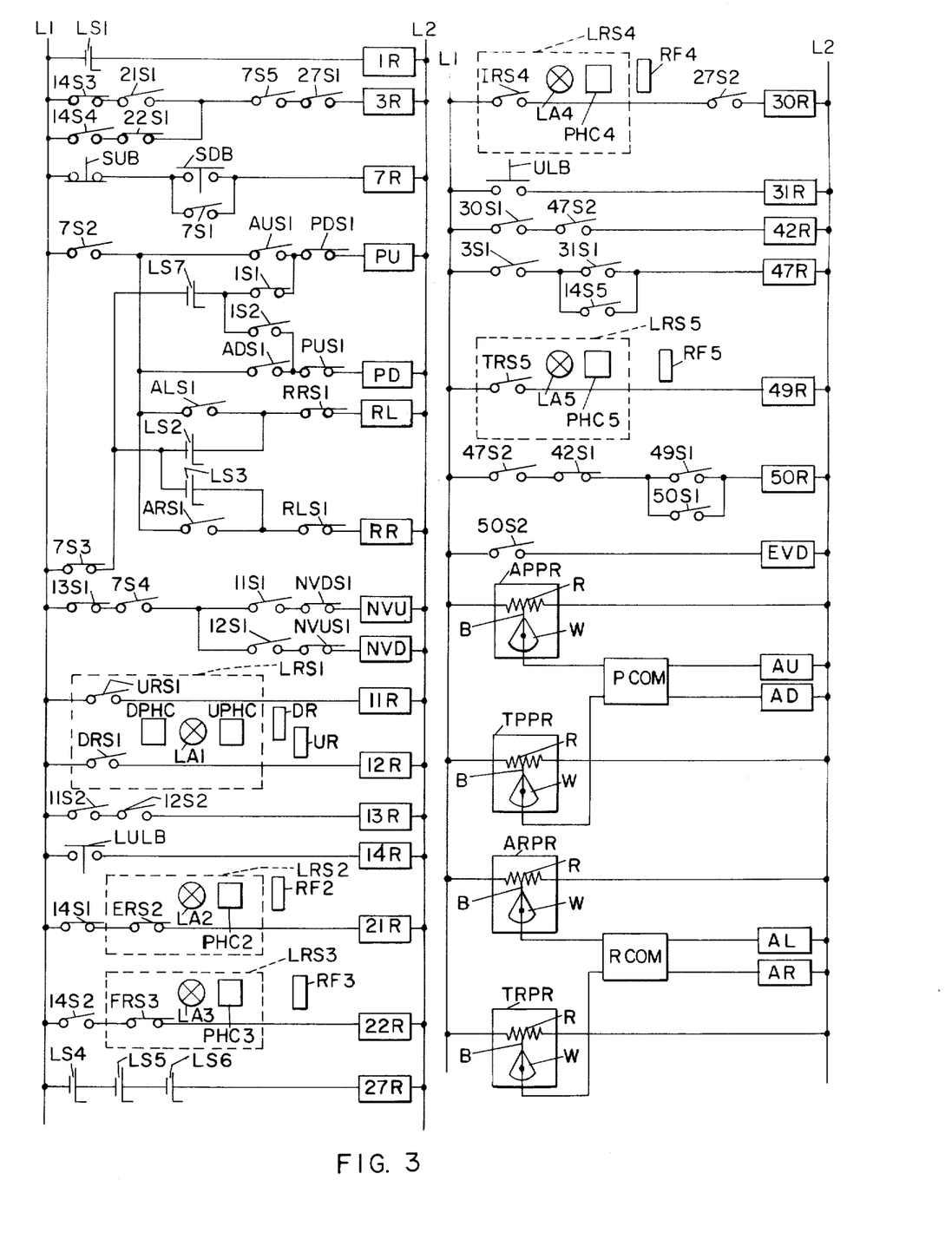
FIG. 3 is a simplified circuit diagram of the control system of the invention.

Shown in FIG. 3 are a plurality of light responsive switches LRS1 through LRS4, the contacts of which are engaged and disengaged in response to the satisfaction of certain predetermined conditions with respect to transfer apparatus 101 both alone and in relation to the load carrier and aircraft 103.

Light responsive switch LRS1 is mounted on transfer apparatus 101 and engages its contacts DRS1 or URS1 when light from its lamp LA1 is reflected back to photocell DPHC or UPHC from reflector strip DR or UR, respectively. These cooperating elements all comprise part of a first control means.

Reflectors UR and DR are each one inch long and are mounted on aircraft 103 in an operatively overlapping manner so that both reflect light from lamp LA1 whenever the roller conveyors of transfer apparatus 101 are within ±one-fourth inch of the vertical level of the conveyors on the aircraft. Outside that zone but within the predetermined inch and one-half range of operation of switch LRS1 one or the other of its contact pairs URS1 or DRS1 will be engaged depending upon whether the conveying equipment of transfer apparatus 101 is below or above the vertical level of the conveying equipment aboard aircraft 103.

Light responsive switches LRS2 and LRS3 comprise part of a cargo sensing means and are also mounted on transfer apparatus 101 as are their respective lamps LA2 and LA3 and reflectors RF2 and RF3. Their contacts ERS2 and FRS3 are engaged when cargo is located at the load carrier and aircraft ends of the transfer apparatus, respectively. Light responsive switch LRS4 is also mounted on transfer apparatus 101. Its reflector RF4 however is mounted on the load carrier. Contacts IRS4 are engaged when the load carrier and transfer apparatus are horizontally aligned and the roller conveyors on the load carrier are within ± one-fourth inch of the vertical level of the roller at the load carrier end of the transfer apparatus.

Light responsive switch LRS5 is mounted on the load carrier and its reflector RF5 is mounted on transfer apparatus 101. Contacts TRS5 of switch LRS5 are engaged in response to the load carrier being located in horizontal alignment with transfer apparatus 101 with its roller conveyors located at a predetermined position above the vertical level of the roller conveyors on the transfer apparatus.

FIG. 3 also discloses a plurality of mechanical switches LS1 through LS7, the contacts of which are engaged and disengaged, as will be explained hereinafter, in response to movement of transfer apparatus 101 about its pitch and roll axes. Mechanical switches LS1, LS2, LS3 and LS7 comprise part of a second control means, whereas mechanical switches LS4, LS5 and LS6 comprise part of a third control means as do light responsive switches LRS4 and LRS5.

Also shown in FIG. 3 are a plurality of attitude resolvers of the gravity sensing pendulum type APPR, TPPR, ARPR and TRPR which comprise another part of the first control means. These have been symbolized as having a weight W to which a wiper blade B is attached for contacting a resistance element R. Other types of devices might also suitably be employed. In the illustrated type, movement of the supporting element, upon which the transducer is mounted, about an axis being monitored, changes the output signal on the associated wiper blade. Two of these transducers, APPR and ARPR, are appropriately mounted on aircraft 103 to sense its movement about its pitch and roll axes, respectively. The other two are appropriately mounted on transfer apparatus 101 to sense its corresponding movements.

Transducers TPPR and TRPR provide output signals equal to those provided by transducers APPR and ARPR, respectively when the pitch and roll attitudes of the conveying equipment of transfer apparatus 101 match those of the conveying equipment on aircraft 103. Corresponding output signals are applied to comparator circuits PCOM and RCOM which provide outputs to energize coils AU, AD and AL, AR of switches AUS, ADS and ALS, ARS depending upon whether transfer apparatus 101 has to be pitched up or down or has to be rolled left or right in order to have its pitch and roll attitudes match those of aircraft 103.

In order to fully understand the manner in which the disclosed apparatus performs, and how the control system of the invention controls that performance the details of both an unloading and a loading operation will be described. Initially, it is to be understood that in order to permit either operation an aircraft must be brought to within a predetermined distance of the aircraft end of transfer apparatus 101, and that apparatus must be positioned appropriately with respect to the aircraft. In practice, with the disclosed constructed embodiment, a 747 freighter, represented by aircraft 103, is towed to transfer apparatus 101 and stopped thereat so that when its nose is opened its conveying equipment is within 30 inches or less of the non-extended conveying equipment on the transfer apparatus. Pitch frame 119 and roll frame 122 are then moved laterally by an operator to place the conveying equipment on transfer apparatus 101 in lateral alignment with that of the aircraft. The operator suspends weights on hooks (not shown) mounted in the nose opening of aircraft 103 adjacent its conveying equipment to load down the forward end and restrict vertical movement as cargo is transferred to and from the aircraft. The outputs of pendulum transducers APPR and ARPR mounted on the aircraft are connected to comparators PCOM and RCOM, respectively. The extendable section of the conveying equipment of transfer apparatus 101 is extended forwardly by the operator to within approximately 3½ inches of the nose opening of the aircraft and the operator by means of manual control and light indicators (not shown) also moves hoisting frame 106 vertically until at least one of the sets of contacts DRS1 or URS1 is engaged.

Assume that the pitch attitude of pitch frame 119 is not within 25 minutes of arc of the pitch attitude of the conveying equipment of aircraft 103 and that the roll attitude of roll frame 122 is not within 20 minutes of arc of the roll attitude of the conveying equipment of the aircraft. The operator, therefore, by means of additional manual controls and light indicators (not shown) adjusts both attitudes of transfer apparatus 101 until these criteria are satisfied. The conveying equipment on the apparatus is now within nominal ranges within which its control system is capable of automatic operation. Consequently, upon being enabled it will further align the pitch and roll axes and the vertical position of the conveying equipment of transfer apparatus 101 to match the corresponding parameters of the aircraft's conveying equipment within prescribed tolerances. In the disclosed constructed embodiment, the prescribed pitch and the roll tolerances have been satisfactorily established as 3 minutes of arc.

With transfer apparatus 101 so prepared, assume that power is applied to the circuits of FIG. 3 and that an unloading operation is selected to take place. In selecting such an operation, transfer selection switch LULB, located in a control console (not shown) on transfer apparatus 101, is maintained in its disengaged condition. Accordingly, coil 14R of a switch 14S remains deenergized and switch 14S unactuated. As a consequence, the conveying equipment on transfer apparatus 101 is prepared for rotation in a direction to move cargo from aircraft 103 on to transfer apparatus 101 and toward its load carrier end.

In order to permit cargo to move from aircraft 103 onto the conveying equipment of transfer apparatus 101 a mechanical stop (not shown) at the aircraft end of the transfer apparatus must be lowered. This is accomplished by the depression of push button SDB, also located in the control console. Push button SDB is hereinafter sometimes referred to as a first switch means. Coil 7R of a switch 7S is thereby energized actuating the switch. Contacts 7S1 close to maintain coil 7R energized so that button DSB may be released. Contacts 7S2 close to enable the conveying equipment on transfer apparatus 101 to be moved by pitch and roll machinery so that its pitch and roll attitudes match the corresponding attitudes of the conveying equipment on aircraft 103 to within the prescribed tolerances. This takes place because the first control means responds to a difference in pitch attitude greater than the prescribed pitch tolerance to cause comparator PCOM to produce an output signal which energizes either coil AU of switch AUS or coil AD of switch ADS. Contacts of these switches in turn cause the energization of coil PU of a switch PUS or coil PD of a switch PDS, respectively. Actuation of one of the other of the latter two switches opens a respective solenoid valve of the pitch machinery and results in the operation of another part of that machinery which comprises a plurality of hydraulic rams (not shown) located at the load carrier end of transfer apparatus 101. The operation of these rams causes pitch deck 119 to pivot upwardly or downwardly with respect to hoisting frame 116 about pins 120. In the disclosed constructed embodiment each of these rams has a 15 inch stroke and is arranged to raise the load carrier end of the approximately 34½ foot long pitch frame 3¾ inches above the horizontal and to lower it 11¼ inches below that reference plane. This, it is to be understood, also raises and lowers accordingly the approximately 42½ foot long extended conveying equipment mounted atop pitch frame 119 on roll frame 122. When pitch frame 119 is positioned so that its pitch attitude matches that of the conveying equipment aboard aircraft 103 within 3 minutes of arc, the established prescribed pitch tolerance, in the disclosed constructed embodiment both inputs to comparator PCOM are within sufficient equality of each other that it cannot provide a large enough output signal to energize either coil AU of switch AUS or coil AD of switch ADS. Thus the actuated PUS or PDS switch releases and the operated solenoid valve closes to stop the movement of the hydraulic rams.

Similarly, roll frame 122 is caused to assume the roll attitude of the conveying equipment aboard aircraft 103 within the prescribed roll tolerance. For this purpose, the first control means responds to a difference in roll attitude between the aircraft and the transfer apparatus in excess of the roll tolerance to cause comparator RCOM to produce an output signal which energizes either coil AL of switch ALS or coil AR of switch ARS, respectively. This closes contact ALS1 or ARS1 to energize coil RL of a switch RLS or coil RR of a switch RRS. The energization of one or the other of these coils actuates the respective switch which opens a corresponding solenoid valve of the roll machinery to cause another part of the roll machinery which comprises a plurality of hydraulic rams (not shown) mounted on the right side of the transfer apparatus to pivot roll frame 122 with respect to pitch frame 119 about pins 124. In the disclosed constructed embodiment each of these rams has an 8½ inch stroke and is arranged to raise and lower each side of the approximately 16 foot wide roll frame 4¼ inches from the horizontal at approximately the 6½ foot point from the center of its pivot pins 124. Upon roll frame 122 matching the roll attitude of the conveying equipment aboard aircraft 103 within 3 minutes of arc, the established prescribed roll tolerance in the disclosed embodiment, both inputs to comparator RCOM are sufficiently equal that the comparator cannot produce a large enough output signal to energize either coil AL of switch ALS or coil AR of the switch ARS. Accordingly, the actuated RLS or RRS switch releases and the operated solenoid valve closes to stop the movement of the hydraulic rams.

In addition to assuming the same pitch and roll attitudes as the conveying equipment aboard the aircraft, transfer apparatus 101 also functions to position its hoisting frame 116 vertically so that the conveying equipment on the transfer apparatus at its aircraft end is level with the conveying equipment at the nose opening of the aircraft within the chosen vertical tolerance. This is accomplished through the cooperation of light responsive switch LRS1 mounted on the transfer apparatus and reflecting strips DR and UR mounted on the aircraft. Any difference in height of more than one-fourth inch between the respective conveying equipment causes the opening of contacts URS1 or DRS1 and the consequent deenergization of coil 11R of a switch 11S or coil 12R of a switch 12S. Deenergization of either coil results in the release of its respective switch and the consequent opening of contacts 11S2 or 12S2 in the circuit of coil 13R of a switch 13S. This causes the release of the switch and the closing of contacts 13S1 to complete the circuit of coil NVU of a switch NVUS or coil NVD of a switch NVDS depending upon whether switch 11S is still actuated to maintain contacts 11S1 engaged or switch 12S is still actuated to maintain contacts 12S1 engaged. Energization of coil NVU or coil NVD results in the actuation of its respective switch. Engaging contacts of these switches are employed to cause hoisting motor 108 to rotate appropriately to raise or lower hoisting frame 106 respectively, until the chosen one-fourth inch vertical tolerance is satisfied. Under such circumstances, both switch 11S and switch 12S are actuated whereupon contacts 11S2 and contacts 12S2 are both engaged and coil 13R is energized. This actuates switch 13S to open contacts 13S1 and interrupt the circuit of coil NVU or NVD, releasing either switch NVUS or switch NVDS whichever was actuated. Hoisting motor 108 is thereby stopped from rotating and a brake applied to maintain hoisting frame 106 in that position. The control system for hoisting motor 108 and its brake will not be described for purposes of brevity, it being understood that any suitable well known hoist control system is satisfactory.

Upon transfer apparatus 101 assuming a first condition in which its vertical position and its pitch and roll attitudes match the coresponding parameters of the conveying equipment of aircraft 103, cargo can be unloaded from the aircraft and transferred to the conveying equipment of the transfer apparatus by operation of the respective conveying equipment. During such the forementioned pitch, roll and hoisting machinery will be controlled by said first control means to maintain the vertical position and the pitch and roll attitudes of the transfer apparatus within the prescribed tolerances of the corresponding parameters of the conveying equipment of the aircraft notwithstanding these parameters may change as the cargo is being unloaded from the aircraft.

The arrival of cargo at the load carrier end of the transfer apparatus interrupts the reflection of light by reflector RF2 from lamp LA2 to photocell PHC2. As a consequence, light responsive switch LRS2 of the cargo sensing means engages contacts ERS2 and coil 21R of a switch 21S is energized actuating the switch. Making contacts of this switch which open in response to its actuation are suitably employed to cause the conveying equipment on the transfer apparatus to stop moving the cargo. Contacts 21S1 close in the circuit of coil 3R of a switch 3S in preparation for the energization of the coil in response to the closing of contacts 27S1.

The stopping of the cargo at the load carrier end of the conveying equipment is an indication to the operator that preliminary conditions for a transfer of cargo from transfer apparatus 101 to the load carrier are satisfied. To prepare these to permit such transfer, the operator after checking to see that the aircraft end of the transfer apparatus is clear, presses push button SUB in the control console. This push button is hereinafter referred to as a second switch means. Its depression interrupts the circuit of coil 7R of switch 7S and the switch releases. As a consequence, the mechanical stop (not shown) at the aircraft end of the transfer apparatus is raised preventing the reception of additional cargo on the transfer apparatus. Also contacts 7S2 and 7S4 disengage disabling the first control means by interrupting the circuits to contacts AUS1, ADS1, ALS1 and ARS1 and to coils NVU and NVD. This renders the first control means ineffective to control the pitch, roll and hoisting machinery. Contacts 7R3, on the other hand, close to prepare the pitch and roll machinery for control by mechanical switches LS1, LS2, LS3 and LS7.

If pitch frame 119 is disposed in a horizontal plane mechanical switch LS7 mounted on that frame is open and the frame remains in that position. Assume, however, that it is not so disposed. As a consequence the cam follower of mechanical switch LS7 of the second control means is disengaged from its cooperating cam mounted on hoisting frame 116 and the switch is closed. Also, assume that the deviation from the horizontal is such that the load carrier end of frame 119 is high. Accordingly, the cam follower of mechanical switch LS1 mounted on frame 119 is in engagement with its associated cam mounted on hoisting frame 116 and the switch is closed. This causes the energization of coil 1R of a switch 1S actuating the switch to open contacts 1S1 and close contacts 1S2. In contrast if the deviation is such that the load carrier end of frame 119 is low, the cam follower of switch LS1 is out of engagement with its associated cam and the switch is open. As a consequence coil 1R is deenergized, switch 1S is released and contacts 1S1 and 1S2 are closed and open, respectively. Depending upon which pair of contacts 1S1 or 1S2 are closed, coil PU or coil PD is energized to actuate switch PUS or switch PDS. As explained previously, actuation of one or the other opens a respective solenoid valve which results in the operation of the hydraulic rams located at the load carrier end of pitch frame 119 to pivot that frame upwardly or downwardly, respectively, about pins 120. Upon the pitch frame assuming a horizontal disposition mechanical switch LS7 opens releasing the actuated PUS or PDS switch. Accordingly, the operated solenoid valve is closed and movement of the associated hydraulic rams ceases.

Similarly, if roll frame 122 is disposed in the same plane as pitch frame 119, mechanical switches LS2 and LS3 mounted on the pitch frame each has its cam follower engaging its associated cam on roll frame 122. Consequently, each switch is open and roll frame 122 remains in that position. Assume, however, that this also is not so. The raising of the right or left side of the roll frame about pivot pins 124 causes the cam follower of the associated mechanical switch LS2 or LS3, respectively, to be disengaged from its cam causing the switch contacts to be closed. As a result, either coil RL of switch RLS or coil RR of switch RRS is energized causing the actuation of its associated switch. This, as explained earlier, causes the opening of a corresponding solenoid valve and results in the operation of hydraulic rams located on the right side of the transfer apparatus to return roll frame 122 to co-planar attitude with pitch frame 119 by pivoting it properly about pins 124. When the roll frame assumes such a position mechanical switches LS2 and LS3 both open and the actuated RLS or RRS switch releases. This causes the operated solenoid valve to close and movement of the associated hydraulic rams ceases.

In response to transfer apparatus 101 assuming a second condition in which its pitch frame 119 is horizontally disposed and its roll frame 122 is co-planar with its pitch frame, the third control means operates to cause the load carrier and transfer apparatus to assume a relationship in which there is vertical alignment between their respective conveying equipment. This disposition of pitch frame 119 horizontally causes the cam follower of mechanical switch LS4 mounted on the pitch frame to engage its associated cam and close the switch. Similarly, the disposition of roll frame 122 in a co-planar position with pitch frame 119 causes the cam followers of mechanical switches LS5 and LS6 which are also mounted on pitch frame 119 to engage their associated cams and close their respective switches. As a consequence, coil 27R of a switch 27S is energized and the switch is actuated to close its contacts 27S1 in the circuit of coil 3R of switch 3S. This completes the circuit to the coil (contacts 14S3 being closed because the transfer selection means has been operated to select an unloading operation, contacts 21S1 being closed because the cargo sensing means has sensed that cargo is located at the load carrier end of the transfer apparatus and contacts 7S5 being closed because the second switch means has been operated to raise the mechanical stop at the aircraft end of the transfer apparatus). Accordingly, switch 3S is actuated and closes its contacts 3S1 in the circuit of coil 47R of a switch 47S. If at this time, self-maintained manual switch ULB has been pressed coil 31R of a switch 31S is energized and the switch is actuated to close its contacts 31S1.

Manual switch ULB is provided in the disclosed constructed embodiment so that a supervisory control system may be employed to monitor that the cargo being unloaded is being directed to the proper bins. With such an arrangement switch ULB is left in its unoperated condition and a pair of contacts (not shown) are connected in parallel with it which close when the supervisory system signifies that a proper bin has been selected. This operation is irrelevant to the instant invention and for present purposes it is to be assumed that switch ULB is permanently closed. Thus, as mentioned, contacts 31S1 are closed and coil 47R of switch 47S is energized and actuates the switch. This closes contacts 47S2 in the circuit of coil 50R of a switch 50S.

Assume at this time, that the conveying equipment on the load carrier is horizontally aligned with the conveying equipment on the transfer apparatus and is located at a predetermined level above the vertical level of the latter conveying equipment. As a result photocell unit PHC5 of light responsive switch LRS5 is receiving radiation energy transmitted by lamps LA5 and reflected by reflector RF5. This closes contacts TRS5 and completes the circuit to coil 49R of a switch 49S which energizes the coil and actuates the switch. Contacts 49S1, consequently, are closed in the circuit of coil 50R of switch 50S when contacts 47S2 close and the circuit is completed to energize the coil. This actuates switch 50S and its contacts 50S1 close in the circuit of coil EVD of a switch EVDS to energize the coil and actuate the switch. The actuation of this switch closes contacts which are employed to cause the load carrier to lower its conveyor equipment toward the level at which the conveyor equipment of the transfer apparatus is located. Various known arrangements of hoisting machinery are suitable for use in accomplishing this and since the particular one employed in the constructed embodiment forms no part of the invention disclosed herein it will not be described in the interest of brevity.

As the conveyor equipment of the load carrier moves downward radiation ceases to be reflected from reflector RF5 of photocell PHC5 and light responsive switch LRS5 opens its contacts TRS5 to interrupt the circuit of coil 49R. This releases switch 49S and contacts 49S1 open in the circuit of coil 50R. In the meantime, however contacts 50S1 have closed to maintain coil 50R of switch 50S energized.

Continued downward movement of the conveying equipment on the load carrier brings it into alignment with the conveying equipment of the transfer apparatus whereupon radiation from lamp LA4 is reflected by reflector RF4 to photocell unit PHC4 causing light responsive switch LRS4 to close its contacts IRS4. This completes a circuit to coil 30R of a switch 30S through closed contacts 27S2 energizing that coil and actuating the switch. As a result, contacts 30S1 close and complete the circuit of coil 42R of a switch 42S through closed contacts 47S2. Coil 42R is thereby energized and switch 42S actuated, causing it to open its contacts 42S1 in the circuit of coil 50R. This interrupts that circuit causing the deenergization of that coil and the release of switch 50S. In consequence, contacts 50S2 open in the circuit of coil EVD and that coil is also deenergized. This releases switch EVDS which causes the load carrier hoisting machinery to stop the downward movement of the conveying equipment on the load carrier with that equipment aligned with the conveyor equipment on the transfer apparatus so that cargo can be transferred from the latter to the former.

It is to be understood that the third control means is also operative to cause the conveying equipment on the load carrier to move into vertical alignment with the conveying equipment on the transfer apparatus in those circumstances in which cargo is to be transferred from the storage bins served by the load carrier to an aircraft. To facilitate understanding the manner in which the third control means causes such movement, assume the transfer selection switch is operated to select an aircraft loading operation. To this end, transfer selection switch LULB is depressed. This switch is of the self maintained type and thus remains depressed with its contacts engaged until manually restored to the unoperated condition. As a result coil 14R is energized and switch 14S is actuated to prepare the conveying equipment on transfer apparatus 101 for operation in a direction to receive cargo from the load carrier and transfer it to aircraft 103. The actuation of switch 14S also closes contacts 14S2 and 14S4 in the circuit of coils 22R and 3R, respectively.

In order to permit transfer apparatus 101 to receive cargo from the load carrier the aircraft end of the transfer apparatus has to be empty. Assume therefore that there is no cargo on the aircraft end of the transfer apparatus. As a result, reflector RF3 reflects light from lamp LA3 to photocell unit PHC3 and contacts FRS3 of light responsive switch LRS3 of the cargo sensing means are open. This deenergizes coil 22R releasing a switch 22S which thereupon closes its contacts 22S1 preparing a circuit for coil 3R of switch 3S.

The absence of cargo from the aircraft end of transfer apparatus 101 during a loading operation indicates to the operator that cargo can be received from the load carrier. As a consequence, he presses the second switch means, push button SDB, which as explained for the unloading operation deenergizes coil 7R and releases switch 7S. This permits the mechanical stop at the aircraft end of the transfer apparatus to be raised. It also opens contacts 7S2 and closes contacts 7S3 and 7S5. The opening of contacts 7S2, as explained for the unloading operation, disables the first control means which would otherwise cause transfer apparatus 101 to be disposed in the first condition in which its conveying equipment is aligned with that aboard aircraft 103. The closing of contacts 7S3, as also explained, enables the second control means to cause the transfer apparatus to be disposed in the second condition in which its conveying equipment is disposed in a horizontal plane. The closing of contacts 7S5 prepares a circuit for coil 3R.

As described in relation to the unloading operation, upon transfer apparatus 101 assuming the second condition, the third control means enables the transfer apparatus and the load carrier to assume a relationship in which there is vertical alignment between their respective conveying equipment. This occurs because coil 27R is energized to actuate switch 27S which as a result close its contacts 27S1 to complete the circuit for coil 3R. Switch 3S thereupon operates and causes the downward movement of the conveying equipment of the load carrier until it is aligned with the conveying equipment on the transfer apparatus in the same manner as described for the unloading operation. It should be noted, however, that manual switch ULB does not have to be depressed during a loading operation to enable the load carrier to move downwardly in this manner. Contacts 14S5 are engaged during loading operations to bypass contacts 31S1 and avoid the necessity of closing switch ULB.

From the foregoing it can be seen that the control system of the invention includes a first control means which operates in response to the operation of first switch means to cause the transfer apparatus to be disposed and maintained in a first condition in which the pitch and roll attitudes of its conveying equipment are in conformity with the corresponding attitudes of the conveying equipment aboard an aircraft. In this first condition the vertical height of the aircraft end of the conveying equipment on the transfer apparatus is level with the conveying equipment on the aircraft at its nose opening.

Furthermore, the control system includes a second switch means which is operable to disable the first control means and to enable a second control means to cause the transfer apparatus to be disposed and maintained in a second condition in which its conveying equipment is disposed in a horizontal plane. In response to the selection of an aircraft unloading operation as well as the presence of cargo on the conveying equipment of the transfer apparatus, a third control means operates to cause the load carrier and transfer apparatus to assume a relationship in which there is vertical alignment between the respective conveying equipment when the transfer apparatus is disposed in its second condition.

The third control means also operates in response to the selection of an aircraft loading operation and the absence of cargo on the conveying equipment of the transfer apparatus to cause the load carrier and the transfer apparatus to assume a relationship in which there is vertical alignment between their respective conveying equipment when the transfer apparatus is disposed in its second condition.

Various modifications in the disclosed control system will be apparent to those skilled in the art and for that reason the foregoing should be considered illustrative and not limiting in any sense.

What is claimed is:

1. A control system for a load carrier and associated transfer apparatus each supporting cargo conveying equipment, said transfer apparatus being disposable in a first condition in which its conveying equipment is capable of transferring cargo to and from conveying equipment aboard an aircraft through an opening in its nose when it is appropriately positioned adjacent one end of said transfer apparatus, said transfer apparatus also being disposable in a second condition in which its conveying equipment is capable of transferring cargo to and from the conveying equipment of said load carrier when it is appropriately located adjacent the end of said transfer apparatus opposite its aircraft end, said control system comprising first switch means; first control means operating in response to the operation of said first switch means to cause said transfer apparatus to be disposed and maintained in said first condition in which the pitch and roll attitudes of its conveying equipment are in conformity with the corresponding attitudes of the conveying equipment aboard said aircraft and the vertical height of the aircraft end of the conveying equipment on said transfer apparatus is level with the conveying equipment on said aircraft at the nose opening, second switch means operable to disable said first control means; second control means operating in response to the operation of said second switch means to cause said transfer apparatus to be disposed and maintained in said second condition in which its conveying equipment is disposed in a horizontal plane; a transfer selection switch operable to select either an aircraft loading or unloading operation for said transfer apparatus; cargo sensing means operating in response to the presence of cargo on the conveying equipment of said transfer apparatus; and third control means operating in response to the operation of said transfer selection means to select an aircraft unloading operation and the operated condition of said cargo sensing means to cause said load carrier and said transfer apparatus to assume a relationship in which there is vertical alignment between their respective conveying equipment when its transfer apparatus is disposed in its second condition.

2. A control system according to claim 1, wherein said third control means also operates in response to the operation of said transfer selection means to select an aircraft loading operation and the unoperated condition of said cargo sensing means to cause said load carrier and said transfer apparatus to assume vertical alignment between their respective conveying equipment when said transfer apparatus is disposed in said second condition.

3. A control system according to claim 2, wherein said transfer apparatus includes pitch, roll and hoisting machinery and said first control means includes pitch and roll attitude transducers supported on said aircraft and said transfer apparatus and cooperative transfer apparatus hoist controlling equipment also supported on both, each said pitch and roll attitude transducer providing an output signal signifying the pitch and roll attitude of the conveying equipment on its respective supporting member, the difference between the respective pitch signals and the respective roll signals controlling said pitch and roll machinery to operate to dispose the conveying equipment of said transfer apparatus with its pitch and roll attitudes in conformity with the corresponding attitudes of the conveying equipment aboard said aircraft, said cooperative transfer apparatus hoist controlling equipment providing a difference signal signifying the difference between the vertical height of the aircraft end of the conveying equipment on said transfer apparatus and the vertical height of the conveying equipment on said aircraft at its nose opening, said difference signal controlling said hoisting machinery to operate to dispose the aircraft end of the conveying equipment on said transfer apparatus level with the conveying equipment on said aircraft at its nose opening.

4. A control system according to claim 3, wherein said second control means includes attitude sensing switches mounted on said transfer apparatus which operate in response to the conveying equipment on said transfer apparatus being disposed in other than a horizontal plane, said switches controlling the pitch, roll and hoisting machinery to cause it to dispose the conveying equipment on said transfer apparatus in said horizontal plane in response to the operation of said second switch means.

5. A control system according to claim 4, wherein said attitude sensing switches include right and left roll attitude switches, said roll attitude switches operating in response to right or left side, respectively of the conveying equipment on said transfer apparatus being pivoted below a horizontal plane.

6. A control system according to claim 5, wherein said attitude sensing switches include first and second pitch attitude switches, said first pitch attitude switch operating in response to the load carrier end of the conveying equipment on said transfer apparatus being pivoted upward from the level of a horizontal plane, said second pitch attitude switch operating in response to the load carrier end of the conveying equipment on said transfer apparatus being pivoted upward or downward from the level of a horizontal plane.

7. A control system according to claim 6, wherein said load carrier includes hoisting machinery, and said third control means includes cooperative load carrier hoist controlling equipment supported on said load carrier and said transfer apparatus, said last mentioned equipment providing a non-alignment signal signifying that said load carrier is located in a predetermined horizontal position at the load carrier end of said transfer apparatus with its conveying equipment located above the vertical position of the conveying equipment on said transfer apparatus, said load carrier hoisting machinery operating in response to said non-alignment signal to lower the conveying equipment on said load carrier until it is in a vertical position in which it will be in vertical alignment with the conveying equipment on said transfer apparatus when said transfer apparatus is disposed in said second condition.

* * * * *